United States Patent [19]

Fleming, Jr. et al.

[11] Patent Number: 5,221,306
[45] Date of Patent: * Jun. 22, 1993

[54] METHOD AND APPARATUS FOR MODIFYING THE TRANSVERSE CROSS SECTION OF A BODY

[75] Inventors: James W. Fleming, Jr., Westfield; Adolph H. Moesle, Jr., Murray Hill, both of N.J.; Fred P. Partus, Atlanta, Ga.

[73] Assignee: AT&T Bell Laboratories, Murray Hill, N.J.

[*] Notice: The portion of the term of this patent subsequent to Mar. 19, 2008 has been disclaimed.

[21] Appl. No.: 607,020

[22] Filed: Oct. 31, 1990

Related U.S. Application Data

[63] Continuation-in-part of Ser. No. 595,340, Oct. 10, 1990, abandoned, which is a continuation of Ser. No. 458,921, Dec. 29, 1989, Pat. No. 5,000,771.

[51] Int. Cl.$^5$ .............................................. C03B 19/00
[52] U.S. Cl. ................................ 65/2; 65/3.11; 65/23; 65/113; 65/292; 82/1.11; 82/118; 364/474.12
[58] Field of Search .............. 65/2, 3.11, 23, 31, 65/113, 292, 61, 105; 156/643, 663; 82/118, 1.11; 364/474.08

[56] References Cited

U.S. PATENT DOCUMENTS

| | | | |
|---|---|---|---|
| 3,492,467 | 1/1970 | Caban et al. | 82/118 X |
| 3,671,839 | 6/1972 | Meyer et al. | 82/118 X |
| 3,684,474 | 8/1972 | Chisholm | 65/105 |
| 3,698,268 | 10/1972 | Cutler | 82/118 |
| 4,282,784 | 8/1981 | Feller et al. | 82/1.11 X |
| 4,300,417 | 11/1981 | Teunissen et al. | 82/1.11 |
| 4,491,463 | 1/1985 | Weinstein et al. | 65/2 |
| 4,498,917 | 2/1985 | Weinstein et al. | 65/2 |
| 4,564,914 | 1/1986 | Ballough et al. | 82/1.11 X |
| 4,759,243 | 7/1988 | Thompson | 82/1.11 |
| 5,000,771 | 3/1991 | Fleming et al. | 65/2 |

*Primary Examiner*—Robert L. Lindsay
*Attorney, Agent, or Firm*—Glen E. Books

[57] ABSTRACT

The transverse cross section of a body is modified by the steps of: a) determining the extent to which the body has material in excess of a desired shape at a plurality of points, b) exposing the body to a local heat source having a temperature sufficiently high to remove material from the surface of the body, and c) moving the surface of the body in relation to the source at a speed which decreases in regions where the body has material in excess of the desired shape so as to remove more material from such regions than from other regions. In a preferred embodiment, the body is an optical fiber preform, the local heat source is the fireball of a plasma torch, and the body is moved relative to the torch by rotating the preform at a controllable angular velocity while the torch is translated along the length of the preform.

10 Claims, 4 Drawing Sheets

METHOD AND APPARATUS FOR MODIFYING THE TRANSVERSE CROSS SECTION OF A BODY

CROSS REFERENCES TO RELATED APPLICATIONS

This is a continuation-in-part of U.S. patent application Ser. No. 595,340 filed Oct. 10, 1990, now abandoned, in the names of James William Fleming and Fred Paul Partus, which, in turn, is a continuation of U.S. patent application Ser. No. 458,921 filed Dec. 29, 1989, now U.S. Pat. No. 5,000,771, granted Mar. 19, 1991 in the names of James William Fleming and Fred Paul Partus.

BACKGROUND OF THE INVENTION

The present invention relates to a method and apparatus for modifying the transverse cross section of a body such as a rod, disk or cylinder and, in a preferred embodiment, relates to a method and apparatus for modifying the cross section of refractory rods, such as optical fiber preforms.

While potentially useful in a wide variety of applications, the present invention evolved in the field of optical fiber fabrication. Optical fibers are thin strands of glass capable of transmitting an optical signal containing a large amount of information over long distances with very low loss. Optical fibers are typically manufactured by constructing an optical fiber preform of appropriate composition and drawing fiber from the preform. A typical preform is in the form of a concentric glass rod having a length of about one meter and an outer diameter of about 20 mm. The inner core of the rod is a high purity, low loss glass such as germanium silicate glass having a diameter of about 1-2 mm. The concentric outer cylinder, referred to as cladding, provides protection to the inner core. The cladding is a layer of glass with a lower index of refraction than the inner core.

In the manufacture of optical fibers from preforms, it is important that the center of the preform core coincide with the center of the preform cross section. In the event of eccentricity in the preform, the fiber drawn from the preform will also be eccentric. As a result, when one eccentric optical fiber is connected to another optical fiber, the transmitting cores will not coincide, and there will be appreciable light transmission loss due to misalignment of the cores.

To prevent the production of eccentric fiber, the preforms are carefully inspected before the drawing process. Preforms which do not meet stringent concentricity requirements are discarded. The consequence is a relatively high rejection rate of expensive preforms. Accordingly, a method for modifying the transverse cross sections of optical preforms so as to reduce preform eccentricity would be highly advantageous in the production of optical fibers.

SUMMARY OF THE INVENTION

In accordance with the invention, the transverse cross section of an elongated body is modified by the steps of: a) determining the extent to which the body has material in excess of a desired shape at a plurality of points, b) exposing the body to a local heat source having a temperature sufficiently high to remove material from the surface of the body, and c) moving the surface of the body in relation to the source at a speed which decreases in regions where the body has material in excess of the desired shape so as to remove more material from such regions than from other regions. In a preferred embodiment, the body is an optical fiber preform, the local heat source is the fireball of a plasma torch, and the body is moved relative to the torch by rotating the preform at a controllable angular velocity while the torch is translated along the length of the preform.

BRIEF DESCRIPTION OF THE DRAWING

The advantages, nature and various additional features of the invention will appear more fully consideration of the illustrative embodiments now to be described in detail in connection with the accompanying drawings. In the drawings.

DETAILED DESCRIPTION

Figure 1:
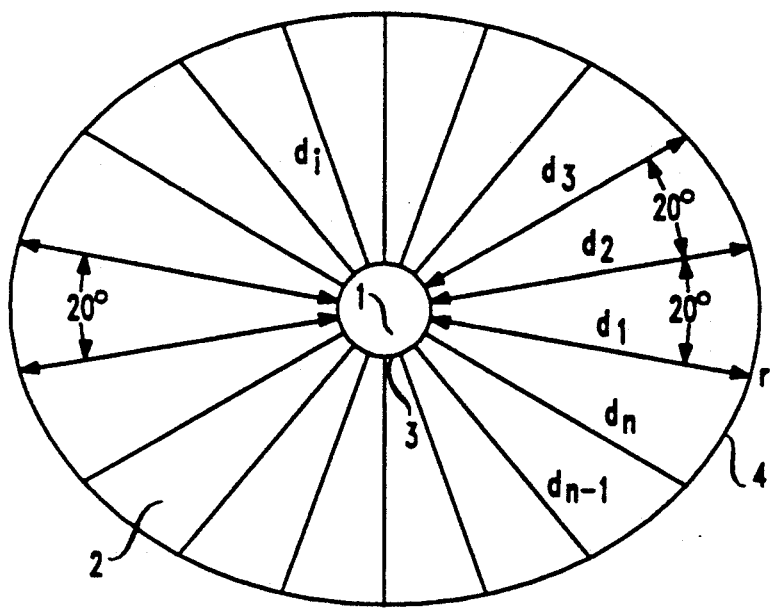
FIG. 1 is a schematic transverse cross section of an elongated body having a shape to be modified in accordance with the invention.

Referring to the drawings, FIG. 1 is a schematic transverse cross section of an elongated body having a shape to be modified in accordance with the invention. Here the illustrative body is an optical fiber preform having in transverse cross section, a core 1 with core perimeter 3 and surrounding the core, a cladding 2 having a preform perimeter 4. The distances ($d_1$, $d_2$, ..., $d_n$) between the preform perimeter and the core perimeter are shown for angular increments of 20° from a reference point r. These distances desirably are all equal, but in practice they are unequal. The set of distances ($d_i$), termed an eccentricity profile, provides a measure of the amount of material to be removed in order to produce a concentric preform.

Figure 2:
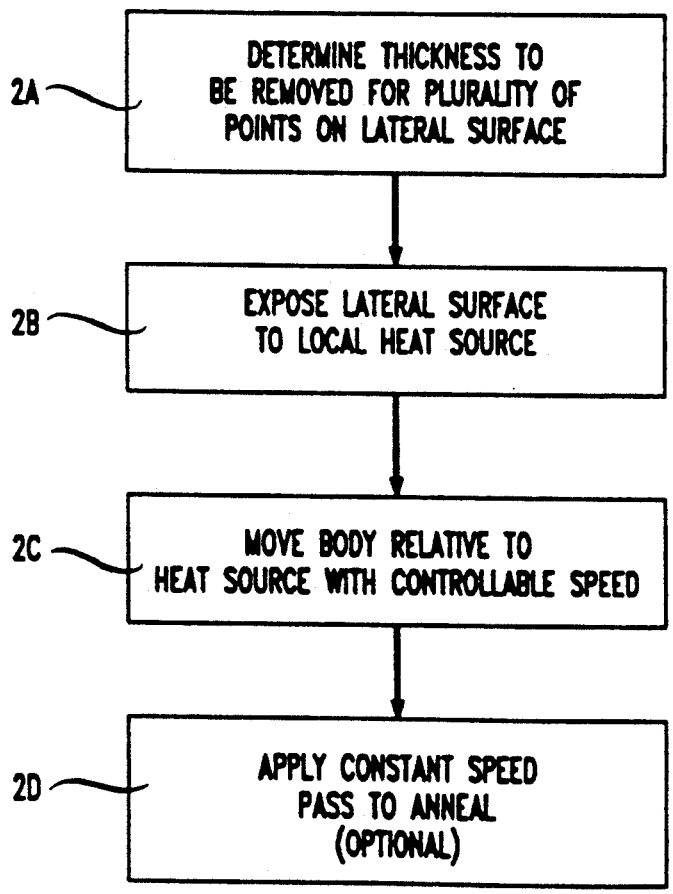
FIG. 2 is a flow diagram showing the process steps used to modify the transverse cross section of an elongated body in accordance with the invention.

FIG. 2 is a flow diagram showing the process steps used to shape or modify the transverse cross section of an elongated body such as that shown in FIG. 1. As shown in FIG. 2A, a preliminary step for the process is to determine, for a plurality of locations on the lateral surface of the body, the thickness of the material that should be removed in order to achieve the desired shape. In the case of modifying a first known, regular cross section into a second known, regular cross section, e.g., converting a square cross section into a circular one, this determination can be made by mathematical algorithm. In most applications, however, it is desired to modify an irregular shape to more closely approximate a regular shape. In such cases the determination is preferably made by making a set of measurements—an eccentricity profile—sufficient to reasonably characterize the geometry of the body. For example, in the modification of optical fiber preforms it has been found sufficient to measure using a commercially available optical scanner, the set of distances ($d_i$) from preform periphery to core periphery, at 20° intervals as shown in FIG. 1. This set of measurements is made at each of several longitudinal locations along the body. Thus if the long dimension of the body is designated by the Z-axis, an eccentricity profile is measured for each of several values of Z along the length. This set of measurements has been found sufficient to characterize the body in that for typical preforms, the distances at unmeasured points on the periphery are close to the values linearly interpolated from the measured points.

The next step shown in FIG. 2B is to expose the lateral surface of the body to a local source of high temperature heat and, at the same time, to move the body and the heat source relative to one another in such a fashion that the relative speed is slower in those regions in which more material is to be removed. Preferably the local source of high temperature heat is the plasma fireball of a plasma torch such as described in detail in copending U.S. Pat. No. 5,000,771, which is incorporated herein by reference.

Figure 3:
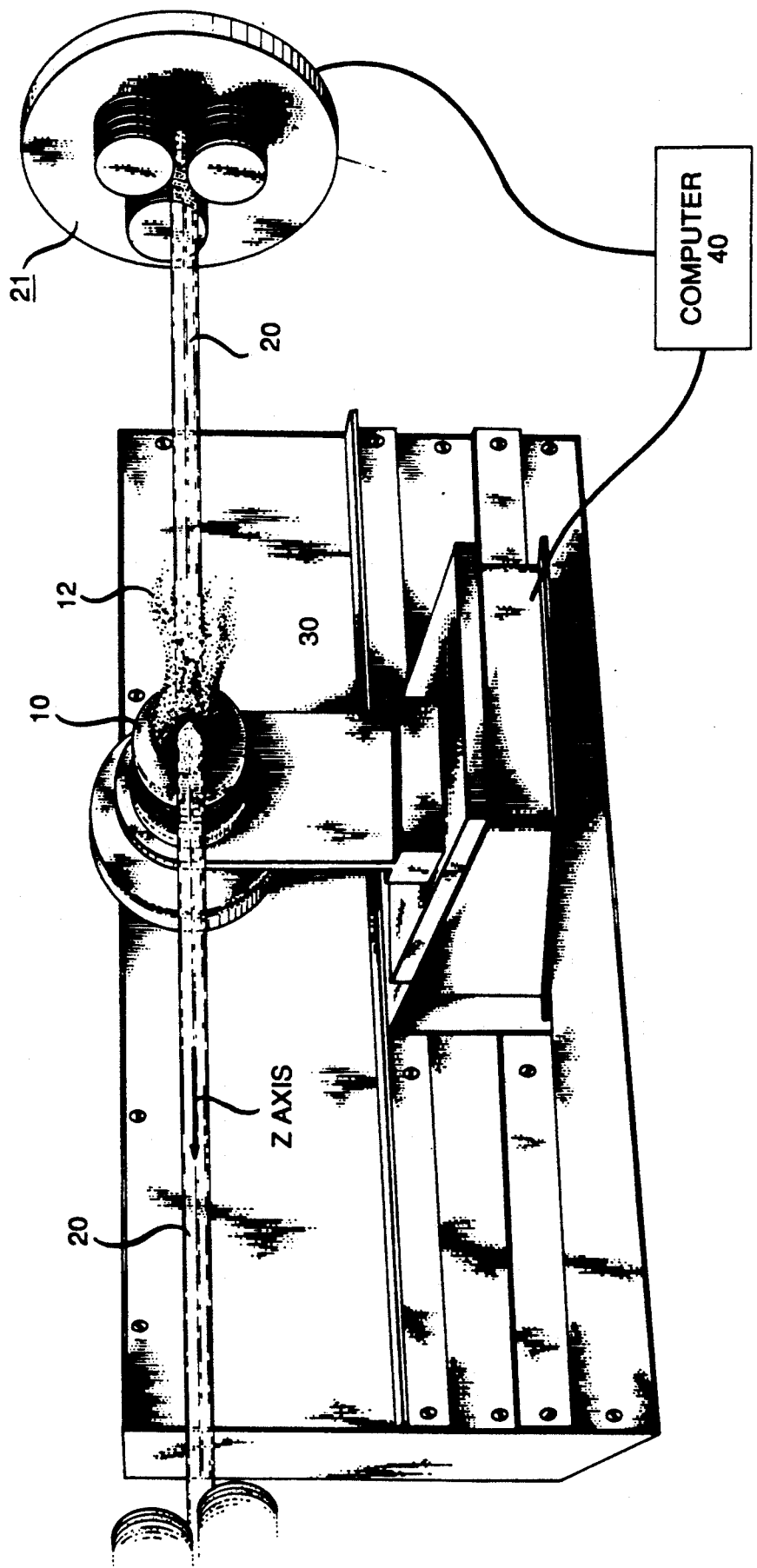
FIG. 3 schematically depicts apparatus used to modify the transverse cross section of a body.

Apparatus for moving the body in relation to the heat source is illustrated in FIG. 3 wherein an elongated body 20, such as an optical fiber preform, is shown mounted on a controllable speed lathe 21. The lateral surface of body 20 is exposed to the plasma fireball 12 of a plasma torch 10. The plasma torch 10 is mounted on a three-axis positioning stage 30 based on the same bed (not shown) as lathe 21 so that the torch position can be precisely controlled during operation. A computer 40 is provided to coordinate and control the rotation of body 20 via lathe 21 and the movement of the torch 10 via positioning stage 30. As will be described, the computer controls the rotational speed of the body 20 about the Z-axis and the speed of torch 10 along the Z-axis in such a fashion that the relative speed of the torch over the body is slower over regions with greater amounts of material to be removed.

Figure 4:
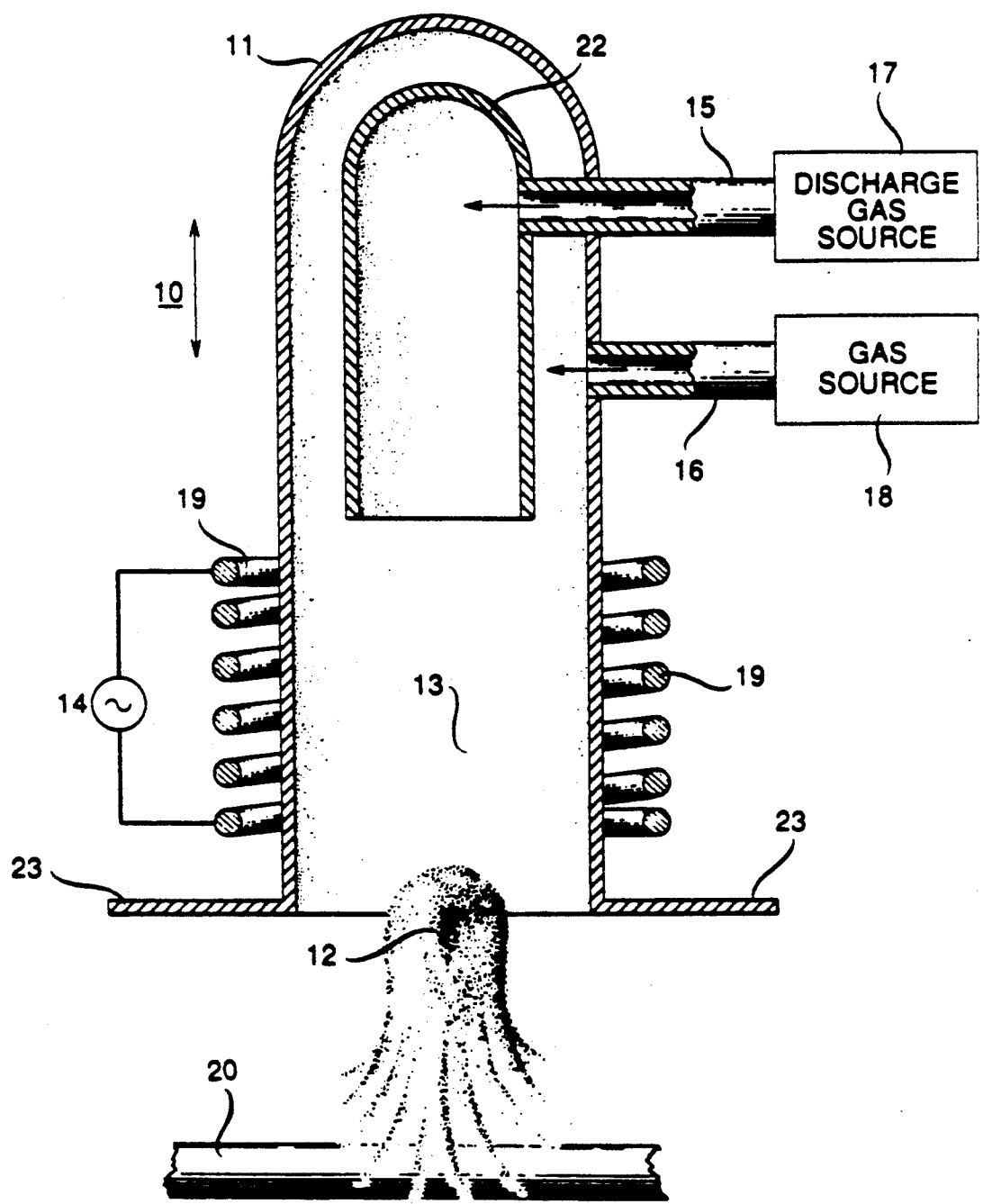
FIG. 4 is a schematic cross section of a preferred local heat source comprising a plasma torch.

In the preferred form, best shown in FIG. 4, torch 10 comprises a fused silica mantle 11 connected to a gas source 17 by tube 15 and to a second gas source 18 by tube 16. Gas source 17 delivers gas used for the plasma discharge, such as $O_2$, into mantle 11 and through shield 22. The plasma fireball 12 is excited by RF power applied by RF generator 14 to RF coil 19.

Gas source 18 supplies a high ionization threshold gas, such as $N_2$, confined to the outer region of the torch by shield 22. This additional gas creates an area in the upper portion of the confinement region where high RF energy is needed to form a plasma. Since the plasma tends to form in regions where resistance to formation is lowest, the presence of the high threshold gas moves a portion of the fireball outside the torch where it can contact optical fiber preform 20.

Referring back to FIG. 3, lathe 21 is preferably a glass lathe having simultaneously rotating chucks at both ends of body 20, such as a Litton Glass Lathe marketed by Litton Engineering Co. To provide controllable rotation speed, the standard chuck rotation motor was replaced by a stepmotor, such as a Model M106-205 stepmotor marketed by Compu Motor Division of Parker Hannifin Corp., Petaluma, Calif. With such modification, the lathe chuck orientation and instantaneous velocity can be controlled in increments of 1° and varied between zero and 200 rpm. Additional stepmotors (not shown) are provided to drive the three axes of the positioning stage 30 controlling the location and traverse speed of torch 10.

Operation of the preform rotation and torch traverse stepmotors is accomplished under control of computer 40 which can be an AT&T PC6300 computer equipped with a Compu Motor PC-23 Motor Indexer. Under this control system the instantaneous rotational velocity of body 20 can be continuously adjusted to match a desired residence time under the torch for a particular angular position and longitudinal distance along body 20. The working distance between the torch and the surface of body 20 is preferably fixed for each etch pass. The preferred working distance is 5–10 mm.

The control algorithm is generated as follows. First, the etch rate E for the type of material comprising body 20 is determined empirically for a desired rotation rate, torch working distance and torch traverse velocity. Next, the amount of material to be removed at each incremental location i on the body is determined, and third, a set of desired residence times for etching at each location—termed a residence time profile ($t_i$)—is calculated and used to control the relative speed between the heat source and the surface of the body.

In reducing the eccentricity of optical fiber preforms, applicants have found the following approach useful in determining the amount of material to be removed and calculating the residence time profile. After the eccentricity profile ($d_i$) is measured as shown in FIG. 1 for several axial positions along the preform, a mean value ($d_m$) is calculated for the ($d_i$) measured at one of the axial positions, i.e. the 18 $d_i$ measured at 20° increments around the periphery are summed and divided by 18. In practice $d_m$ for a single axial position has been found to be representative of the $d_m$ for the entire preform.

While the theoretical optimal residence time $t_i$ for each location i is $$t_i = \frac{1}{E}(d_i - d_o),$$

where E is the etch rate, $d_i$ is the measured (or interpolated) d at location i, and $d_o$ is the ultimate target dimension this optical residence time is not generally achievable. The etching rate E is valid only for the experimental conditions under which E was determined. For example, depending on the rate of rotation of the body relative to the transverse speed of the torch, some turn-to-turn overlap of the etching region will result from the finite width of the plasma fireball. Thus a given location on the body surface might experience preheating and etching over some multiple of turns due to the overlap, interspersed with cooling periods while the location is out of the fireball. Thus in the absence of complex mathematical modeling of the etch rate, it is preferred to duplicate as nearly as possible, the conditions under which E was determined. This can be accomplished by maintaining the average rotation rate and torch traverse speed equal to those used in the test to determine E.

Thus for optical fiber preforms the preferred residence time $t_i$ is calculated as $$t_i = \frac{1}{E}(d_i - d_m) + \frac{1}{\text{testRPM}}$$

where the "test RPM" is the rotation rate used in the test to determine E. When this profile is converted to rotation rate, the rotation rate varies symmetrically about the test RPM and the average rotation rate equals the test RPM. With this algorithm the mechanics of the motors and the lathe impose a lower limit on the residence time. This limit, in turn, limits the amount of eccentricity which can be corrected in one pass, and multiple passes may be required to correct highly eccentric bodies.

The traverse speed of the torch is preferably fixed during the etch run at the same constant value used in the etch rate determination test. The etch zone follows a distorted helical path of constant pitch down body 20. The speed is chosen to be sufficiently slow that the swath of each etch zone overlaps at each rotation. It is preferably also slower than the average surface speed due to rotation.

The pulses needed to drive the lathe and torch stepmotors are generated under the command of the PC-23. The rotation stepmotor requires an exact number of pulses to effect exactly one revolution of the body 20 if it is not to lose positional accuracy. Preferably this is accomplished by iteratively adjusting the rate information provided by the calculated residence time profile, so that the integrated total equals the number of pulses required for one full turn, while the motor is gradually ramped up and down to the desired speeds.

Where the body 20 is an optical fiber preform, after etching the body is preferably subjected to constant-heating pass to anneal any thermal stress caused by the etching process.

Figure 5:
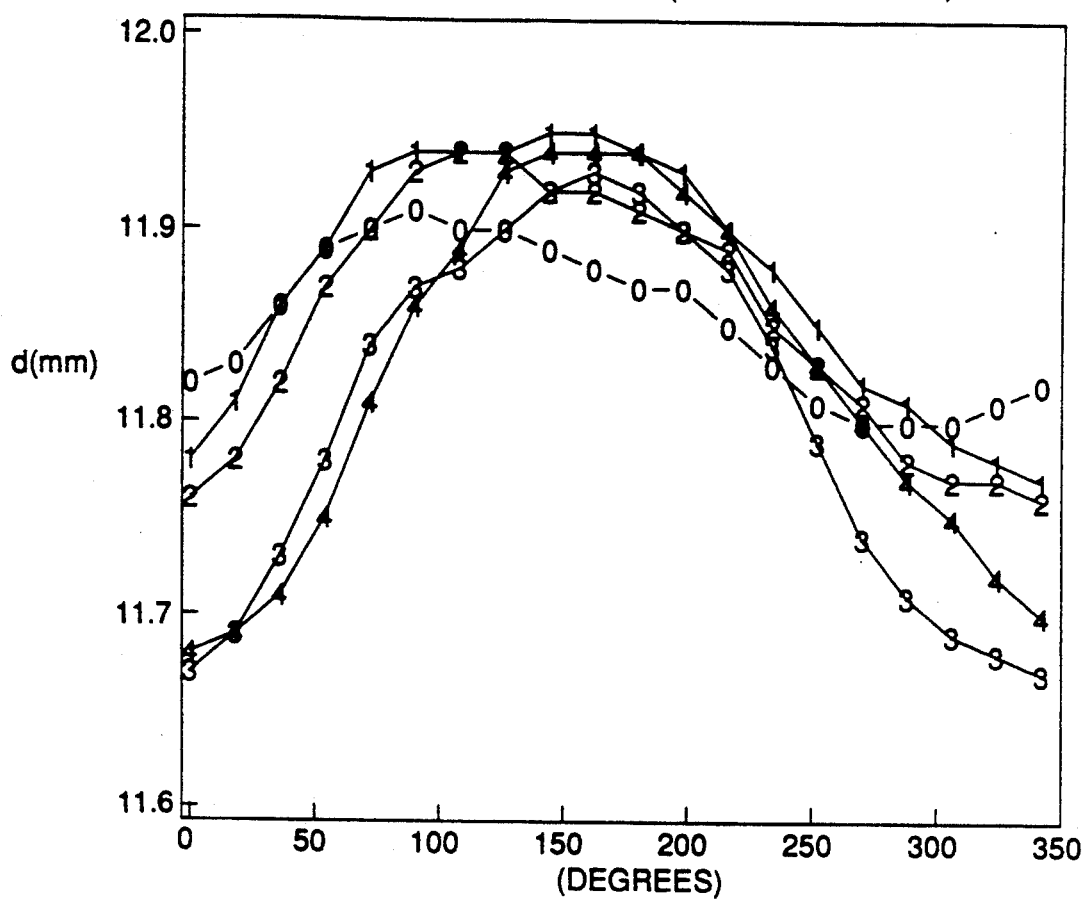
FIG. 5 is a graphical illustration useful in understanding the invention, which represents at various locations on an optical fiber preform before processing, the distances d from the core perimeter to the outer surface of the preform.

The application of the invention can be better understood in relation to the following specific example. The eccentricity of the core of a 23.8 mm diameter optical fiber preform was determined by optical scanning at five positions along the preform and interpolated for positions in between. The measured profile is shown in FIG. 5, which plots the distance d, between core periphery and preform periphery for 20° increments. The five plots are for five positions, designated 0 to 4, along the preform length. As can be seen, the preform is eccentric with a maximum eccentricity at about 150°.

Figure 6:
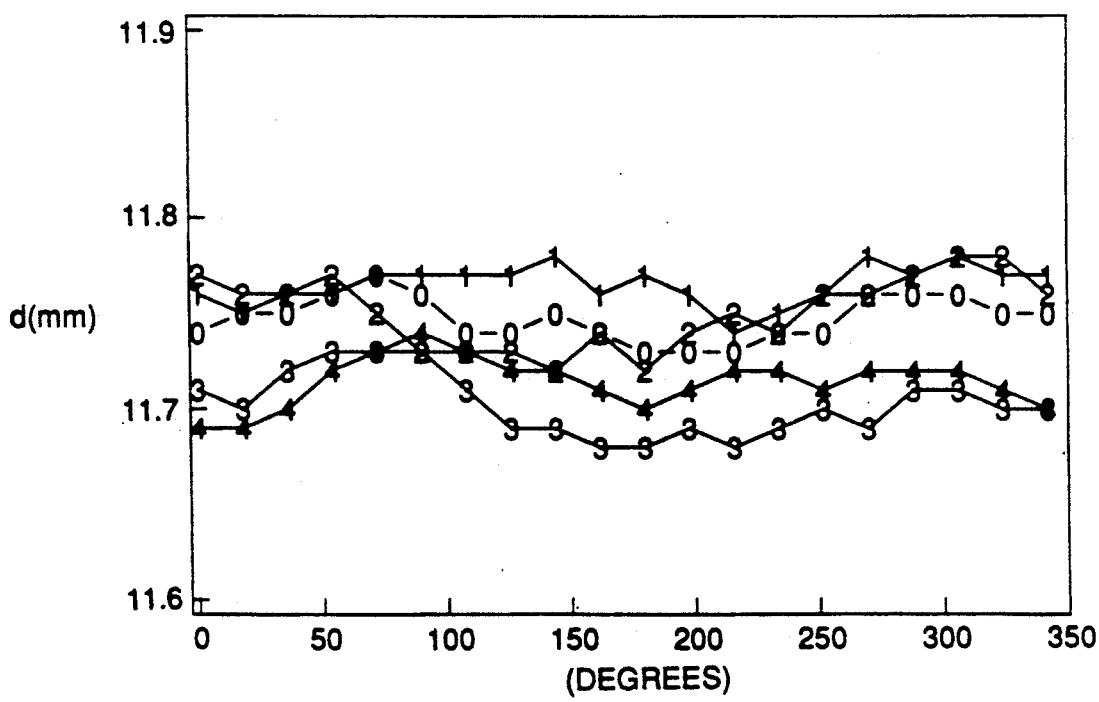
FIG. 6 is a graphical illustration showing the distances d after processing in accordance with the invention. It is to be understood that these drawings are for purposes of illustrating the concepts of the invention and, unless otherwise stated, are not to scale.

The measured eccentricity profile (FIG. 5), was used to calculate the residence profile for the controllable speed lathe in accordance with the algorithm described above. The preform was mounted on the lathe so that the orientation of the eccentricity with respect to the torch was known. The RF plasma torch set to operate at 28 KW plate power was turned on, and the preform was rotated using the calculated residence profile while the torch was moved along the length of the preform at a constant rate of 5 cm per min. After etching, the preform was annealed and remeasured. FIG. 6 shows the eccentricity profile at five locations designated 0 to 4 along the preform after the single etch pass. As can be observed the degree of eccentricity is markedly reduced.

Thus in accordance with the invention, the transverse cross section of a body of material is modified by a) determining for each of a plurality of regions on the lateral surface of the body the extent to which the body at the respective location has material in excess of a desired shape; b) exposing the body to a local heat source having a temperature sufficiently high to remove material from the surface of the body, and c) moving the body surface in relation to the source at a speed which decreases in regions where the body has material in excess of the desired shape so as to remove more material from such regions of excess than from other regions of the body.

In the preferred practice of the invention, the determination of the extent to which the body has material in excess of a desired shape comprises measuring the radial extent of the body at a plurality of points and interpolating the radial extent of the body at unmeasured points. The local heat source is preferably a plasma torch for generating a plasma fireball, and the body is preferably moved in relation to the heat source by rotating the body about a longitudinally extending axis while displacing the heat source parallel to the axis. Advantageously, the body is rotated at a variable speed constrained to a constant period of time for each rotation, and the heat source is displaced parallel to the axis at a constant speed. The invention is particularly useful for bodies of refractory material such as optical fiber preforms.

Apparatus for modifying the transverse cross section of an elongated body in accordance with the invention comprises: a) a lathe or similar means for rotating the body about a longitudinally extending axis at a controllable rotational speed, b) a local heat source having a temperature sufficiently high to remove material from the body, c) a stage or other displacement means for moving the local heat source parallel to the axis adjacent to the body at a controllable axial speed; and d) a computer or other control means for controlling the rotational speed of the lathe and the axial speed of the local heat source so that the speed of the body surface in relation to the torch decreases in regions where the body has material in excess of a desired shape. Preferably the local heat source is a plasma torch for generating a plasma fireball.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

We claim:

1. A method for modifying the transverse cross section of a body of refractory material comprising the steps of:
   a) determining for each of a plurality of regions on the lateral surface of said body the extent to which said body has material in excess of a desired shape at said regions,
   b) exposing the body to a plasma torch heat source having a temperature sufficiently high to remove material from the surface of said body;
   c) moving the body surface in relation to the source at a speed which decreases in regions where the body has material in excess of a desired shape so as to remove more material from such regions of excess than from other regions on said body.

2. The method of claim 1 wherein the determination of material in excess of a desired shape comprises measuring the radial extent of said body at a plurality of different locations and interpolating the radial extent of said body at unmeasured locations.

3. The method of claim 1 wherein said local heat source is a plasma torch for generating a plasma fireball.

4. The method of claim 1 wherein said body is moved in relation to source by rotating said body about a longitudinally extending axis while displacing said torch parallel to said axis.

5. The method of claim 4 wherein said body is rotated about said axis at a variable rotational speed constrained to a constant period of time for each rotation.

6. The method of claim 4 wherein said torch is displaced parallel to said axis at a constant speed.

7. The method of claim 1 wherein said body comprises glass material.

8. The method of claim 1 wherein said body comprises an optical fiber preform.

9. Apparatus for modifying the transverse cross section of a refractory body comprising:

a) lathe means for rotating said body about a longitudinally extending axis at a controllable rotational speed;
b) a plasma torch heat source for generating sufficient heat to remove material from said body;
c) displacement means for moving said heat source parallel to said axis adjacent to said body;
d) control means for controlling said rotational speed of said lathe means so that the speed of the body surface in relation to the torch decreases in regions where the body has material in excess of a desired shape.

10. Apparatus according to claim 9 wherein said heat source is a plasma torch for generating a plasma fireball.

* * * * *